United States Patent
Zhu et al.

(10) Patent No.: US 7,736,513 B2
(45) Date of Patent: Jun. 15, 2010

(54) LIQUID-SOLID FLUIDIZED BED WASTE WATER TREATMENT SYSTEM FOR SIMULTANEOUS CARBON, NITROGEN AND PHOSPHOROUS REMOVAL

(75) Inventors: Jingxu Zhu, London (CA); George Nakhla, Woodbridge (CA); Yubo Cui, Dalian (CN)

(73) Assignee: The University of Western Ontario, London, ON (CA)

( * ) Notice: Subject to any disclaimer, the term of this patent is extended or adjusted under 35 U.S.C. 154(b) by 191 days.

(21) Appl. No.: 11/892,959

(22) Filed: Aug. 28, 2007

(65) Prior Publication Data

US 2008/0053897 A1     Mar. 6, 2008

Related U.S. Application Data

(63) Continuation-in-part of application No. 10/784,890, filed on Feb. 24, 2004, now Pat. No. 7,261,811, which is a continuation-in-part of application No. 09/676,453, filed on Oct. 2, 2000, now Pat. No. 6,716,344.

(51) Int. Cl.
    *C02F 3/30* (2006.01)
(52) U.S. Cl. .................. 210/605; 210/617; 210/603; 210/150; 210/259; 210/903; 210/906
(58) Field of Classification Search ........... 210/150, 210/151, 252, 259, 605, 615–617, 630, 903, 210/906, 908
See application file for complete search history.

(56) References Cited

U.S. PATENT DOCUMENTS 4,968,427 A * 11/1990 Glanser et al. ............. 210/610

(Continued)

FOREIGN PATENT DOCUMENTS

CA     2205003     5/1996

(Continued)

OTHER PUBLICATIONS

Kunii, D. And Levenspiel, O., Fluidization Engineering, Butterworth-Heinemann, Stoneham, MA, USA (1991).

(Continued)

*Primary Examiner*—Fred Prince
(74) *Attorney, Agent, or Firm*—Hill & Schumacher; Lynn C. Schumacher

(57) ABSTRACT

Biological nutrient removal (BNR) in wastewater treatment to remove carbonaceous substrates, nutrients and phosphorus, has recently become increasingly popular worldwide due to increasingly stringent regulations. Biological fluidized bed (BFB) technology, which could be potentially used for BNR processes, can provide some advantages such as high efficiency and compact structure. This present invention incorporates the fixed-film biological fluidized bed technology with the biological nutrient removal in a twin liquid-solid fluidized bed, which has achieved the simultaneous elimination of organic carbon, nitrogen and phosphorus, in a very efficient manner and with very compact space requirements. The BNR-LSFB has two fluidized beds, running as anoxic/anaerobic and aerobic processes to accomplish simultaneous nitrification and denitrification and to remove carbonaceous substrates, nutrients and phosphorus, with continuous liquid and solids recirculation through the anoxic/anaerobic bed and the aerobic bed. The new BNR-LSFB system is not only an excellent alternative for conventional activated sludge type BNR technologies but is also capable of processing much higher loadings and suitable for industrial applications.

22 Claims, 6 Drawing Sheets

The schematic diagram of yet another embodiment of the twin liquid-solid fluidized bed biological nutrient removal system where one fluidized is a fast fluidized bed and the other is a particulate fluidized bed, so that the system is a circulating fluidized bed biological nutrient removal system.

U.S. PATENT DOCUMENTS

| | | | | |
|---|---|---|---|---|
| 5,670,047 A | | 9/1997 | Burke | 210/603 |
| 5,733,454 A | * | 3/1998 | Cummings | 210/603 |
| 5,747,311 A | * | 5/1998 | Jewell | 435/176 |
| 5,961,830 A | | 10/1999 | Barnett | 210/603 |
| 6,716,344 B1 | | 4/2004 | Bassi et al. | 210/189 |

FOREIGN PATENT DOCUMENTS

| | | |
|---|---|---|
| CA | 2498747 | 3/2004 |
| FR | 2 676 044 | 11/1992 |
| WO | WO 2005/080276 | 9/2005 |

OTHER PUBLICATIONS

Weber, W. J., Hopkins, C. B. And Bloom, R., Physical-chemical treatment of wastewater. J. Wat. Pollut, Control Fed., 42, 83-88 (1970).

Jeris, J.S. and Owens, R. W., Polit-scale high-rate biological dentrification, J. Wat. Pollut. Control Fed., 47, 2045-2057 (1975).

Hoyland, G. And Robinson, P.J., Aerobic treatment in OXITRON biological fluidized bed plant at Coleshill, Wat. Pollut. Control, 82, 479-493 (1983).

Cooper, P.F. and Williams, S. C., High-rate nitrification in a biological fluidized bed, Wat. Sci. Tech., 22, 431-442 (1990).

Semon, J., Sadick, T., Palumbo, D., Santoro, M and Keenan, P., Biological upflow fluidized bed dentrification reactor demonstration project—Stanford, CT, USA, Wat. Sci. Tech., 36, 139-146 (1997).

Zhu, J., Zheng, Y., Dimitre G. Karamanev and Amarjeet S.B., (Gas-) Liquid-solid circulating fluidized beds and their potential applications to bioreactor engineering, Can. J. Chem. Eng., 78, 82-94 (2000).

Liang, W.G., Zhang, S.L., Zhu, J.X., Yu, Z. Q., Jin, Y. And Wang, Z.W., Flow characteristic of the liquid-solid circulating fluidized bed, Power Technol. 90, 95-102 (1997).

Zheng, Y., Zhu, J.Z., Bassi, A.S. and Margaritis, A., The axial hydrodynamic behaviour in a liquid-solid circulating fluidized bed. Can. J. Chem. Eng. 77, 284-290 (1999).

Zheng, Y., Zhu, J.-S., Marwaha, N.S. and Bassi, A.S., "Radical solids flow structure in a liquid-solids circulating fluidized bed", Chem. Eng. J., 88(2), 141-150, 2002.

Liang, W.-G., Wu, Q.-W., Uy, Z.-Q., Jin, Y. And Bi, X-T., Flow regimes of the three-phase circulating fluidized bed, American Institute Chem. Eng. J., 41, 267-271 (1995).

Liang, W.-G., Yu, Z.-Q., Jin, Y., Wang, Z.-W., and Wu, Q.-W., Phase holdups in a gas-liquid-solid circulating fluidized bed, Chem. Eng. J. & Biochem. Eng. J., 58, 259-264 (1995).

Liang, W.-G., Wu, Q.-W., Uy, Z.-Q., Jin, Y. And Wang, Z.-W., Hydrodynamics of a gas-liquid-solid three phase circulating fluidized bed, Can. J. Chem. Eng., 73, 656-661 (1995).

Robinson JA, Trulear AG, and Characklis WG, Cellular Reproduction and Extracellular Polymer Formation by Pseudomonas aeruginosa in Continuous Cultures, Biotechnol. & Bioeng., XXV, 1409, (1984).

Chian ES, and DeWalle FB, Treatment of High Strength Acidic Wastewater with a Completely Mixed Anaerobic Reactor, Water Research, 11, 295-304, (1977).

Rogalla F., Payradeau M., Bacquet G, Bourbigot, MM and Sibony J, Nitrification and Phosphorus Precipitation with Biological Aerated Fillers, Water Environ. Res., 62(2), 169-176, (1990).

Switzenabum MS, and Jewel WJ, Anaerobic attached-film expanded bed reactor treatment, J. Water Pollution Control Fed. 52, 1953-1965.

Casey TG, Wentzel MC, Ekama GA, Lowenthal RE, and Marais GVR, "A Hypothesis for the Causes and Control of Anoxic-Aerobic (AA) Filament Bulking in Nutrient Removal Activated Sludge Systems", Water Sci. Tech., 290 (7), 203-212, 1994.

Musvoto EV, Casey TG, Ekama GA, Wantzzel MG and Marais GVR, The Effect of Incomplete Dentrification on Anoxic-Aerobic (Low F/m) Filament Bulking in Nutrient Removal Activated Sludge Systems, Water Sci. Tech., 29(7), 295-299, 1994.

Van Dijk, J.C. and Braakensiek, H. Phosphate removal by crystallization in a fluidized bed. Wat. Sci. Tech., 17, 133-142 (1985).

Battistoni, P., Pavan, P., Cecchi, F. And Mata-Alvarez, J. Phosphate removal in real anaerobic supernatants: Modelling and performance of a fluidized bed reactor. Wat. Sci. Tech., 38, 275-283 (1998).

Zweger B, Arnold E and Wildever PA, Nutrient Balances for Combined Nitrification and Dentrification in Biofilters, Water Sci. Tech., 4(4), 91-95, 2000.

Burton, Franklin L., Wastewater Engineering Treatment, Disposable and Reuse, Third Edition, Metcalf & Eddy, Inc., pp. 614-635.

* cited by examiner

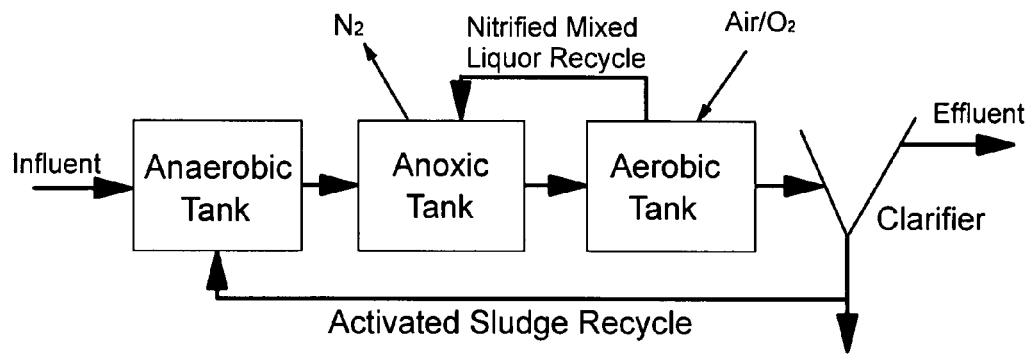
Figure 1  A typical prior art suspended growth Biological Nutrient Removal (BNR) process for treatment of wastewater;
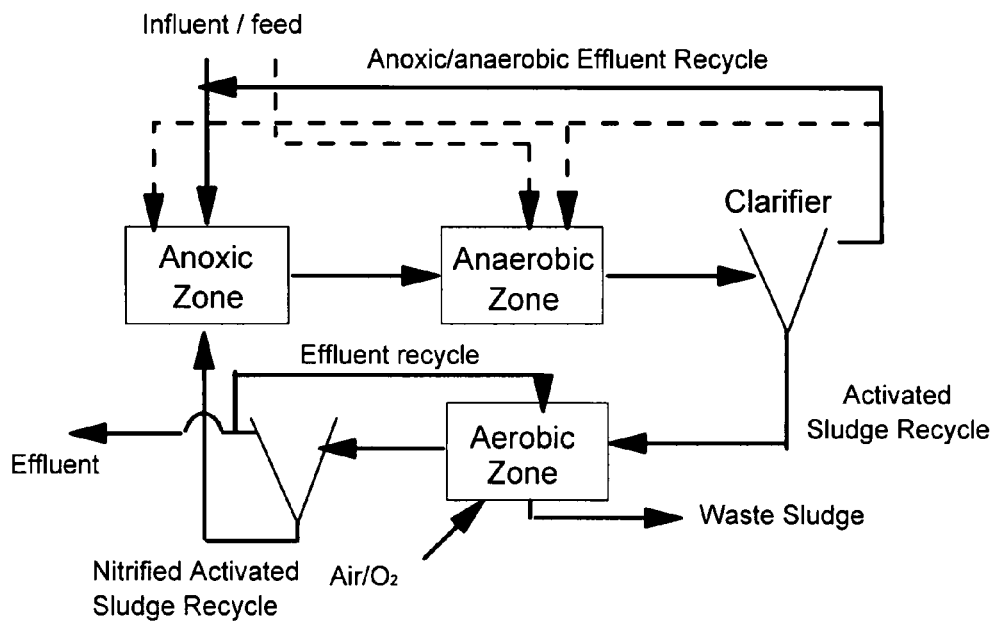
Figure 2  The schematic diagram of a typical embodiment of the fixed-film Biological Nutrient Removal process according to the present invention

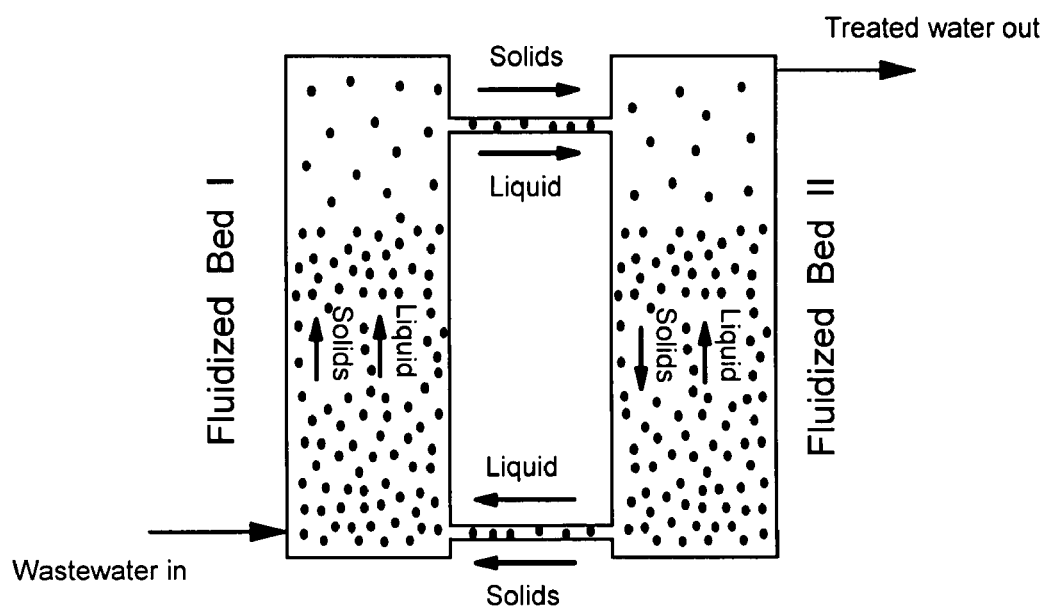
Figure 3 The schematic block diagram of the twin liquid-solid fluidized bed biological nutrient removal system

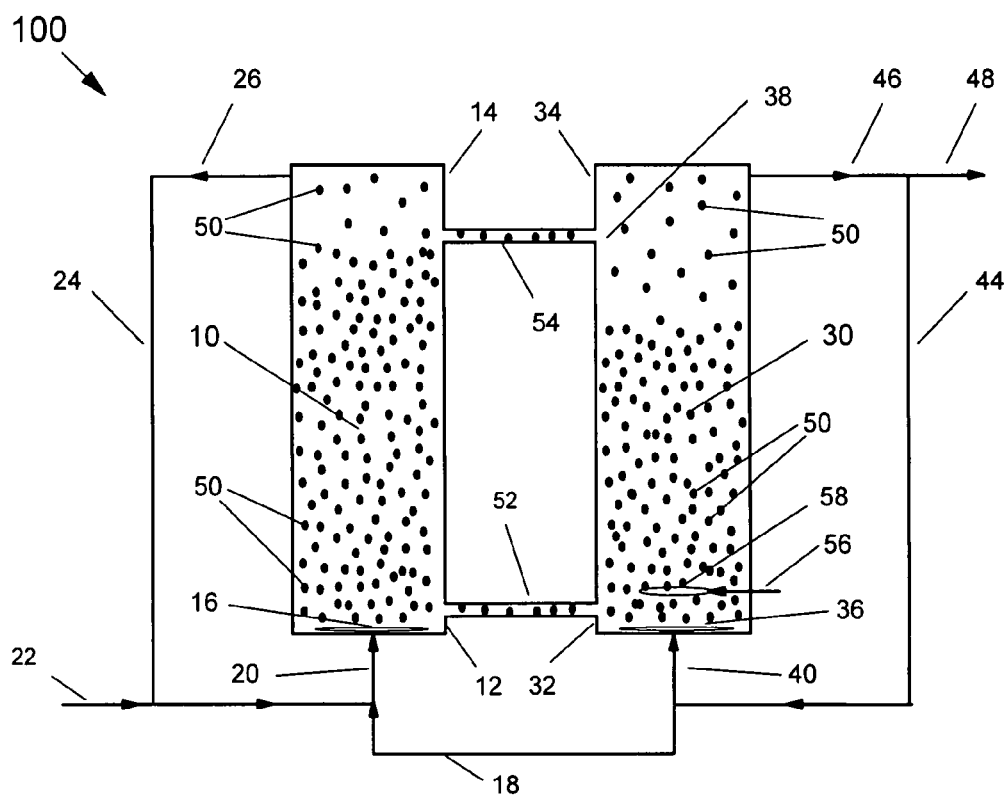
Figure 4  The schematic diagram of one embodiment of the twin liquid-solid fluidized bed biological nutrient removal system

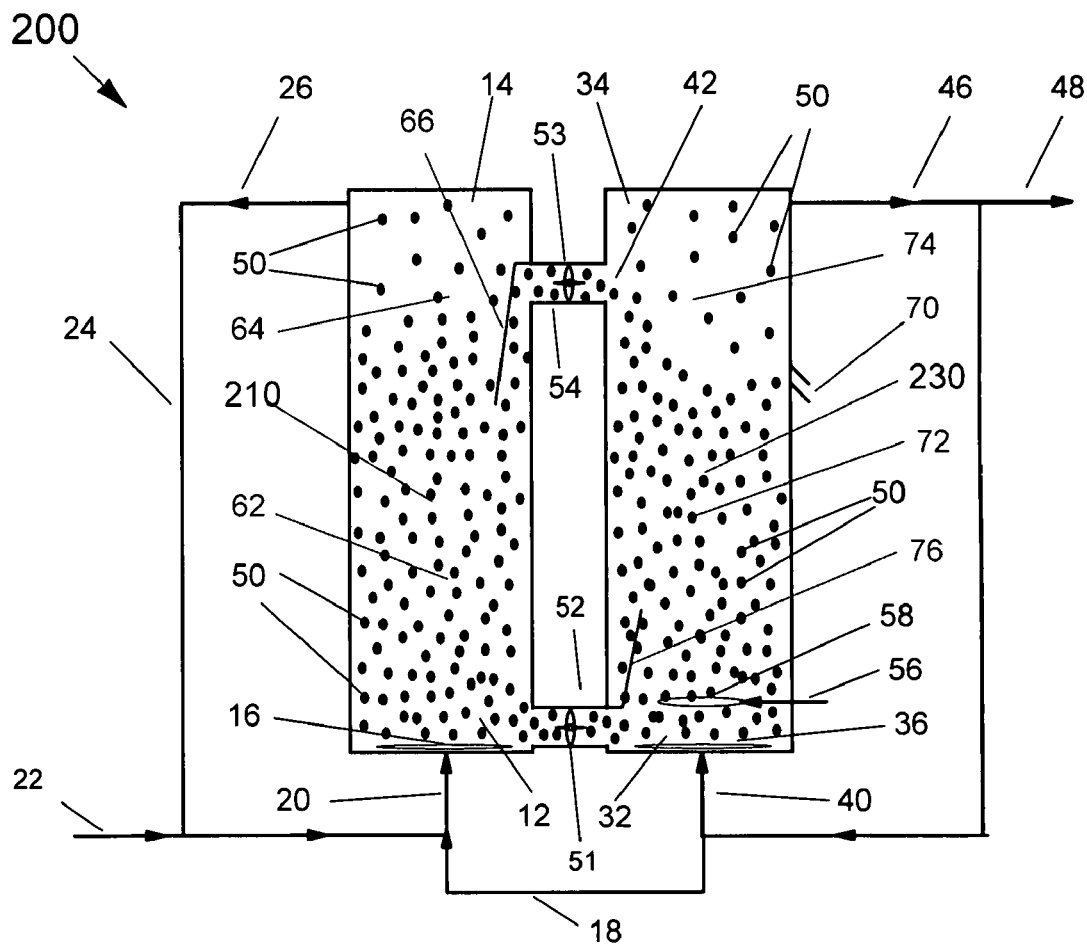
Figure 5 The schematic diagram of another embodiment of the twin liquid-solid fluidized bed biological nutrient removal system where both fluidized beds are particulate liquid-solid (or gas-liquid-solid) fluidized beds

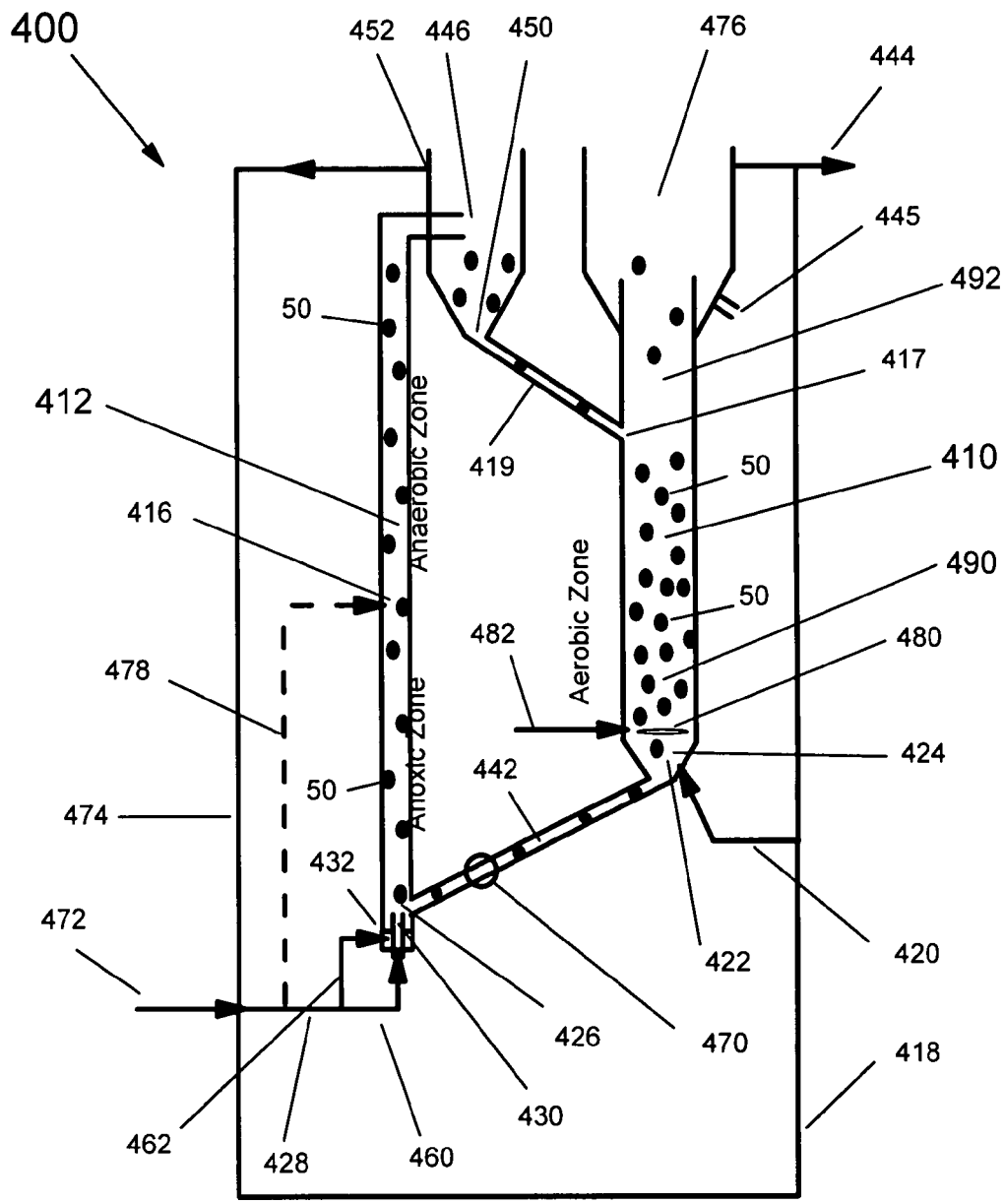
Figure 6 The schematic diagram of yet another embodiment of the twin liquid-solid fluidized bed biological nutrient removal system where one fluidized is a fast fluidized bed and the other is a particulate fluidized bed, so that the system is a circulating fluidized bed biological nutrient removal system.

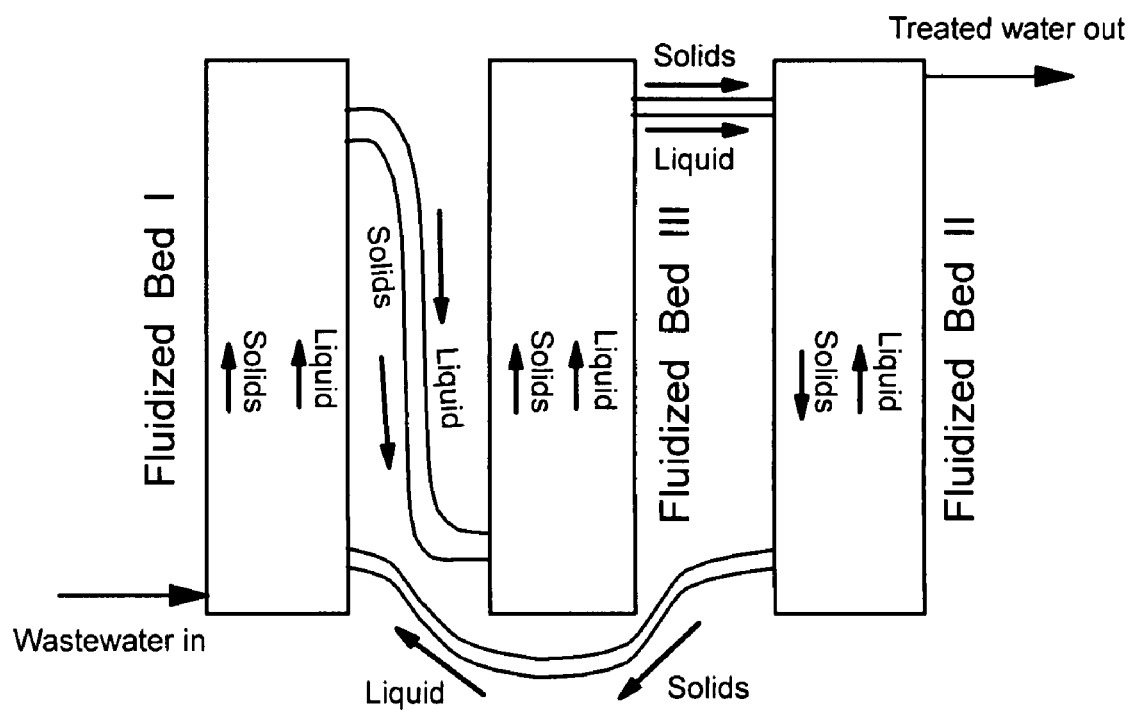
Figure 7 The schematic diagram of a three-bed liquid-solid fluidized bed biological nutrient removal system

LIQUID-SOLID FLUIDIZED BED WASTE WATER TREATMENT SYSTEM FOR SIMULTANEOUS CARBON, NITROGEN AND PHOSPHOROUS REMOVAL

CROSS REFERENCE TO RELATED U.S. APPLICATIONS

This patent application is a continuation-in-part application of U.S. patent application Ser. No. 10/784,890 filed on Feb. 24, 2004, which has now been allowed and issued on Aug. 28, 2007 as U.S. Pat. No. 7,261,811, which is a continuation-in-part application of U.S. patent application Ser. No. 09/676,453 filed on Oct. 2, 2000, now U.S. Pat. No. 6,716,344 and both of which are incorporated herein by reference in their entirety.

FIELD OF THE INVENTION

The present invention relates to a fluidized bed, and more particularly the present invention relates to a liquid-solid and gas-liquid-solid circulating fluidized bed arrangements specially suited for wastewater treatment and the simultaneous removal of carbon, nitrogen and phosphorus.

BACKGROUND OF THE INVENTION

Fluidization technology has been developed for close to one century from its first application to coal gasification by Winkler in the 1920s [1]. Since then, fluidized beds have been used for many different applications such as gas-solid, liquid-solid, and gas-liquid-solid contactors and to carry out a variety of different processes as chemical and biological reactors.

The application of fluidized beds to the biological wastewater treatment processes originated from observations of denitrification, made whilst using activated carbon to remove organic compounds from chemically treated sewage in a fluidized bed [2]. Since then, biological fluidized beds (BFBs) have been investigated for carbon oxidation, nitrification, denitrification and anaerobic treatment, for a wide variety of waters and wastewaters [3, 4, 5, 6]. In contrast to conventional biofilm reactors, in which media are fixed, the media immobilized on particles in a BFB are suspended in upflowing wastewater. Hence, BFBs have the advantages of increased liquid-solid interfacial area, enhanced contact between liquid and media, and increased liquid flowrate, as well as enhanced contact between gas and liquid if gas is present.

Biological fluidized beds are usually liquid-solid fluidized beds or gas-liquid-solid fluidized beds when air is added to the system for aerobic process. Fluidization of liquid-solid systems is controlled by the liquid flow rate [7, 8]. For a given liquid-solid system, the bed is initially fixed when liquid flow rate is lower than the minimum fluidization velocity. When liquid velocity exceeds the minimum fluidization velocity, the operation of the bed is transferred into the conventional or particulate liquid-solid fluidization regime (PFR). In a liquid-solid conventional or particulate fluidized bed (PFB), solid particles are nearly uniformly suspended in the liquid and are therefore in good contact with the liquid phase, with excellent interfacial mass transfer due to the continuous movement of the particles in the liquid and the drag exerted by the liquid. With a further increase of the liquid velocity, some particles begin to be transported out of the bed. At this time, the fluidized bed is in the transition from the particulate fluidization regime to the fast fluidization regime [7, 8, 9, 10].

When the liquid velocity is sufficiently high, normally when it is higher than the terminal velocity of the particles in the bed, large quantity of particles are transported out of the bed. At this point, the bed has entered the fast fluidization regime (FFR) (sometimes, also referred to as the circulating fluidization regime) to form a fast fluidized bed (FFB). (Sometimes, FFB is also referred to as a riser fluidized bed or simply riser, but the term riser may also be broadly used for any fluidized bed with a net solids upflow which is the definition we will adopt here in this application). Fast fluidized bed normally provides even higher liquid-solid mass transfer efficiency and higher liquid throughput than particulate fluidized bed. In FFB, as the particles are constantly carried out of the bed (normally from the top) by the upflowing liquid, more particles need to be fed into the FFB (normally at or near the bottom) to maintain a liquid-solid suspension. These particles fed into the FFB bottom may be fresh particles or particles from an upstream process in cases where the particles only need to go through the FFB once.

In cases where the particles should remain in the FFB for an extended period of time, particles flowing out from the top of the FFB should be recirculated back to feed into the bottom of FFB. Such recirculation may be through a standpipe for particle downflow or a conventional PFB where there is a net particle downflow, but can also be realized by other means. When such particle recirculation is realized through a particulate fluidized bed (PFB) with net particle downflow, the entire system including the FFB and the PFB forms a particle flow loop which is often referred to as a circulating fluidized bed (CFB).

In the case of gas-liquid-solid (three-phase) fluidized bed, air or other gases is injected into the bed, normally at or near the bottom of the bed. This applies to either a FFB or a PFB, or both. Gas passes through the bed as rising bubbles while interacting with the liquid and solid particles. Similar transitions occur from the fixed bed, to a conventional particulate gas-liquid-solid (three-phase) fluidized bed, and then to a fast gas-liquid-solid (three-phase) fluidized bed [11-13]. In a conventional particulate three-phase fluidized bed with bubbles flowing upwards, there are actually more than just one fluidization regime (such as dispersed bubbling and coalescing bubbling regimes) but for simplicity we will just refer them collectively as particulate fluidization regime (PFR) and the corresponding particulate three-phase fluidized bed as particulate fluidized bed (PFB).

The advantages of biological fluidized beds (BFBs) may be utilized to increase the efficiency of wastewater treatment processes. Traditionally, the most conventional and widely used design for municipal and industrial wastewater treatment is the activated sludge (AS) process, which employs a primary clarifier, an aeration tank, and a secondary clarifier. In such a process, nitrogen is merely converted from the more toxic ammonia form to nitrates and phosphorus removal is achieved by chemical addition. The process is classified as a suspended-growth system in which microbes responsible for treatment are in suspension. "Fixed-film" bioreactors have some advantages over the conventional activated sludge process. In fixed-film bioreactors, bacterial films are immobilized on an attachment media rather than remain in suspension. Due to the immobilization of biomass on media, the loss of biomass by shearing is the only mechanism for the escape of biosolids in the bioreactor effluent. The sloughed biomass is mostly decaying biomass that has good settling characteristics and can be readily separated from the liquid [14]. The most salient advantage of fixed-film vis-à-vis suspended growth systems is higher biomass densities per unit volume, resulting not only in more compact bioreactor sizes but also better ability to handle shock organic loadings as well as mitigate inhibition and toxic impacts. Other advantages include enhanced retention of biosolids, and better sludge settling characteristics which may affect other things such as the sizing of secondary clarifiers. The most commonly used fixed-film processes in wastewater treatment are trickling filters, and rotating biological contactors (RBCs) [15]. Anaerobic filters [16] and aerated biological filters [17] are also used, albeit less frequently than trickling filters and RBCs. When the biofilm is immobilized on particulate solid carriers in fluidized bed, the advantages of BFBs, such as increased liquid-solid interfacial area and enhanced contact between liquid and media, can be utilized to further increase the efficiency of the fixed-film bioreactors [18]. It should be noted that such biological fluidized bed fixed-film bioreactors are all operated in the conventional particulate fluidization regime, with relatively low liquid velocities.

These processes (suspended growth and fixed-film bioreactors including fixed-film BFB), however, can only achieve secondary effluent quality and additional treatment is required for nitrogen (N) and phosphorus (P) removals. To address the above problem and in response to increasingly stringent effluent nutrient criteria as a result of deteriorating surface water quality, biological nutrient removal (BNR) processes have become increasingly popular recently [19]. In BNR processes, nitrogen and phosphorus can be removed simultaneously [20, 21]. A typical BNR process is shown in FIG. 1. These BNR processes are essentially suspended growth systems, which employ a combination of anaerobic, anoxic, and aerobic suspended growth biological reactors with or without primary clarification. BNR processes involve diverse microbial groups and utilize the ability of selected microbes, known as phosphorous accumulating organisms (PAO) to undertake luxury phosphorus uptake, whereby some of the phosphorus stored in the cells is released during anaerobic conditions to be followed by a greater phosphorus uptake during aerobic conditions. Furthermore denitrifying bacteria that can elicit oxygen from nitrates reduce the organic loading to be treated aerobically.

BNR processes are known to offer several advantages over the more conventional activated sludge processes, namely superior effluent quality, a significant reduction in aeration energy requirements (likely due to utilization of formed nitrates to remove organic matter), improved sludge settling characteristics, a reduction in sludge quantities (likely due to lower bacterial yields in the anoxic tanks), and the elimination/minimization of chemical sludge. Although BNR activated sludge systems require more process controls as compared to conventional activated sludge systems, advances in process controls and data logging capabilities have significantly reduced human requirements and thus both systems now require comparable operator attendance. Consequently these BNR processes offer significant savings in both capital and operation/maintenance cost, in addition to the advantages of BNR over conventional activated sludge systems and their ability to meet stringent total nitrogen and phosphorus effluent criteria.

On the other hand, however, the reliability of the activated sludge BNR process in response to influent changes both in terms of quantity and characteristics (i.e. COD—Chemical Oxygen Demand, N, P, COD/P and COD/N ratios) have been questioned to the extent that many BNR plants have standby chemical dosing systems for P removal. Incomplete denitrification and low food to microorganisms (F/M) ratio have been observed to cause filamentous bulking conditions in BNR activated sludge systems [22, 23]. In some cases, external sources of carbon may be required to achieve P and N removal, because of low concentrations of readily biodegradable organics.

In view of the aforementioned shortcomings of the suspended growth BNR processes, there is a need to develop more effective BNR wastewater treatment processes. It would be ideal if the BNR concept can be combined with the fixed-film BFB process so that advantages of both processes can be utilized simultaneously. So far, no BFBs (without the combination with BNR) have accomplished effective phosphorus removal without using some chemical methods [24, 25]. To the best of our knowledge, a reliable BFB fixed-film BNR process that simultaneously achieves biological phosphorus and nitrogen removal has not been developed. Although nitrogen removal by simultaneous nitrification-denitrification has been accomplished in biological filters [26] by alternating oxic and anoxic conditions within the filter, very low nitrogen removal efficiencies (~20% influent nitrogen) have been achieved.

It would be very advantageous to provide a high-efficiency biological fluidized bed for simultaneous removal of carbon, nitrogen and phosphate. However, one of the key difficulties is how to arrange the three different processes, anaerobic, anoxic and aerobic processes, in an integrated fluidized bed system.

SUMMARY OF THE INVENTION

Embodiments of the present invention are directed to a fixed-film Biological Nutrient Removal (BNR) wastewater treatment system using a Twin (Gas-) Liquid-Solid Fluidized Bed (Twin-LSFB or GLSFB) system for carbon, nitrogen, and phosphorus removal.

An embodiment of the present invention provides a process for biological nutrient removal in a raw wastewater feed stream to remove carbon, nitrogen and phosphorus therefrom, comprising the steps of:

flowing raw wastewater feed stream into a first fluidized bed and flowing a first fluidizing fluid into the first fluidized bed and passing solid particles having effective immobilized bacteria coated thereon and the first fluidizing fluid through an anoxic zone maintained under anoxic conditions suitable for denitrification of raw wastewater constitutents flowing through the anoxic zone, said first fluidized bed being operated with a liquid velocity of the first fluidizing fluid being lower than a transition velocity from a particulate fluidization regime to a fast fluidization regime;

circulating said solid particles and the first fluidizing fluid through an anaerobic zone maintained under anaerobic conditions in said first fluidized bed suitable for the release of stored phosphorus;

separating some of said first fluidizing fluid from said solid particles to form a recycle stream and circulating said solid particles and a remaining amount of the first fluidizing fluid into a second fluidized bed, wherein the first fluidizing fluid includes at least the recycle stream which is flowed into the first fluidized bed;

circulating the particles transferred to the second fluidized bed with a stream of a second fluidizing fluid through the second fluidized bed, the second fluidized bed having an aerobic zone maintained under aerobic conditions suitable for biodegradation of raw wastewater constitutents forming part of the second fluidizing fluid in the presence of oxygen to carbon dioxide, water, and nitrates by the immobilized bacteria to produce nitrified effluent from the aerobic zone; and circulating solid particles from said second fluidized bed to the first fluidized bed along with a part of the nitrified effluent and separating the remaining nitrified effluent from said solid particles in said second fluidized bed and removing a portion of this separated nitrified effluent from the system as treated effluent and recycling the rest back into an inlet to the second fluidized bed to form the second fluidizing fluid.

In an embodiment of the invention there is provided a twin liquid-solid fluidized bed system, comprising:

solid particles having effective immobilized bacteria coated thereon, a first fluidized bed having a first and second end, said first fluidized bed being a riser fluidized bed including an inlet at said first end for introducing a first fluidizing fluid into said first fluidized bed;

a second fluidized bed being a downer fluidized bed having a first end and a second end;

first connecting conduit connecting said second end of said first fluidized bed to said first end of said second fluidized bed, said first connecting means including means to feed said solid particles into said second fluidized bed;

second connecting conduit connecting said second end of said second fluidized bed to said first end of said first fluidized bed; and means to feed said solid particles having effective immobilized bacteria coated thereon into said second fluidized bed through said first connecting conduit and to feed said solid particles into said first fluidized bed through said second connecting conduit, wherein said solid particles and said second fluidizing fluid flow in counter flow relationship in said second fluidized bed and wherein said solid particles and said first fluidizing fluid flow co-currently in said first fluidizing column, said first fluidized bed configured such that a liquid velocity of the first fluidizing fluid is lower than a transition velocity from a particulate fluidization regime to a fast fluidization regime.

A further understanding of the functional and advantageous aspects of the invention can be realized by reference to the following detailed description and drawings.

BRIEF DESCRIPTION OF THE DRAWINGS

Further features, objects and advantages will be evident from the following detailed description of the preferred embodiments of the present invention taken in conjunction with the accompanying drawings in which;

FIG. 1 illustrates a typical Prior Art suspended growth biological nutrient removal process for treatment of wastewater;

FIG. 2 shows a schematic block diagram of the process for the fixed-film biological nutrient removal process according to the present invention;

FIG. 3 shows a diagram of the twin liquid-solid fluidized bed biological nutrient removal system absent details of the fluid flow paths exterior to the two coupled columns;

FIG. 4 is a schematic diagram of a generic embodiment of a twin liquid-solid fluidized bed biological nutrient removal system constructed in accordance with the present invention;

FIG. 5 is the schematic diagram of an embodiment of the twin liquid-solid fluidized bed biological nutrient removal system configured for operation in which both fluidized beds (riser column and downer column) are operated in the particulate liquid-solid (or gas-liquid-solid) fluidization regime;

FIG. 6 is the schematic diagram of another embodiment of the twin liquid-solid fluidized bed biological nutrient removal system where one fluidized is a fast fluidized bed and the other is a particulate liquid-solid (or gas-liquid-solid) fluidized bed, configured such that the riser is operated in fast fluidization regime and the downer is operated in the conventional particulate fluidization regime; and FIG. 7 is a schematic diagram of a three-bed liquid-solid fluidized bed biological nutrient removal system.

DETAILED DESCRIPTION OF THE INVENTION

The systems described herein are directed, in general, to apparatus and methods for wastewater treatment and the simultaneous removal of carbon, nitrogen and phosphorus using coupled circulating fluidized bed arrangements.

Although embodiments of the present invention are disclosed herein, the disclosed embodiments are merely exemplary and it should be understood that the invention relates to many alternative forms. Furthermore, the Figures are not drawn to scale and some features may be exaggerated or minimized to show details of particular features while related elements may have been eliminated to prevent obscuring novel aspects. Therefore, specific structural and functional details disclosed herein are not to be interpreted as limiting but merely as a basis for the claims and as a representative basis for enabling someone skilled in the art to employ the present invention in a variety of manner. For purposes of instruction and not limitation, the illustrated embodiments are all directed to embodiments of apparatus and methods for wastewater treatment and the simultaneous removal of carbon, nitrogen and phosphorus using coupled circulating fluidized bed arrangements.

As used herein, the term "about", when used in conjunction with ranges of dimensions of particles or other physical properties or characteristics, is meant to cover slight variations that may exist in the upper and lower limits of the ranges of dimensions of particles so as to not exclude embodiments where on average most of the dimensions are satisfied but where statistically dimensions may exist outside this region. It is not the intention to exclude embodiments such as these from the present invention.

When it is stated that system is configured such that both fluidized beds are operated as conventional particulate fluidized beds (PFB), operating under the particulate fluidization regime (PFR), this means that the superficial liquid velocity in each fluidized bed is below the transition velocity from the particulate fluidization regime to the fast fluidization regime, so that the particles are not grossly entrained upwards by the upflowing liquid stream.

When it is stated that system is configured such that the riser is operated in fast fluidization regime and the downer is in the conventional particulate fluidization regime, this means that the superficial liquid velocity in the riser is higher than the transition velocity from the particulate fluidization regime to the fast fluidization regime so that the particles in the riser are primarily entrained upwards by the upflowing liquid stream, and the superficial liquid velocity in the downer is below the transition velocity from the particulate fluidization regime to the fast fluidization regime, so that the particles are not grossly entrained upwards by the upflowing liquid stream.

Embodiments of the present invention provide a fixed-film Biological Nutrient Removal (BNR) wastewater treatment system using a Twin (Gas-) Liquid-Solid Fluidized Bed (Twin-LSFB or Twin-GLSFB) system for carbon, nitrogen, and phosphorus removal.

Disclosed herein is a new fixed-film BFB-BNR process, as shown in block diagram form in FIG. 2, realized in a new twin liquid-solid fluidized bed system (twin-LSFB), which may also be called a twin gas-liquid-solid fluidized bed system (twin-GLSFB) in embodiments in which air or other gas is injected into at least one of the fluidized beds in the system.

The new twin-LSFB/GLSFB technology utilizes the high contact efficiency of the fluidized bed and integrate all three treatment zones of a BNR, anaerobic, anoxic and aerobic zones, into a single unit, the twin-LSFB/GLSFB. It will be understood that hereinafter, that when reference is being made to liquid-solid fluidized bed systems (LSFB) and/or twin liquid-solid fluidized bed systems (twin-LSFB), it is also referring to gas-liquid-solid fluidized bed systems (GLSFB) and/or twin gas-liquid-solid fluidized bed systems (twin-GLSFB).

Referring to FIG. 3, embodiments of the present invention integrate at least two liquid-solid fluidized beds directly, to form an entirely integrated twin-LSFB system (or GLSCFB). A benefit of the twin-LSFB/GLSFB system, which includes the LSCFB/GLSCFB is that it has two separate fluidized beds where two separate processes such aerobic and anoxic processes, can be accommodated in the same system.

In an embodiment of the twin-LSFB, both fluidized beds are operated as conventional particulate fluidized beds (PFB), operating under the particulate fluidization regime (PFR). In Fluidized Bed I, both liquid and particles move upwards; and in Fluidized Bed II, liquid moves upwards and particles move downwards. Particles are then circulated from Fluidized Bed I to Fluidized Bed II through a conduit at or near the top ends of the two fluidized beds and circulated back from Fluidized Bed II to Fluidized Bed I through a conduit at or near the bottom ends of the two fluidized beds.

In another embodiment Fluidized Bed I is configured as a fast fluidized bed operating under the fast fluidization regime, where both liquid and particles move upwards at higher velocities. Fluidized Bed II will still be operating in the particulate fluidization regime (PFR), with particles flowing downwards counter-currently to the upflowing liquid. Again, particles are circulated from Fluidized Bed I to Fluidized Bed II through a conduit at or near the top ends of the two fluidized beds and then circulated back from Fluidized Bed II to Fluidized Bed I through a conduit at or near the bottom ends of the two fluidized beds. For this second option, the entire system may also be called an LSCFB and GLSCFB system, which can be considered a special case of the twin-LSFB and twin-GLSFB system.

LSCFB and GLSCFB are relatively new types of chemical and biological processors, that have only been studied very recently [7-13]. To the inventors' knowledge, although LSCFB and GLSCFB offer many distinct advantages for some chemical and bioprocesses, they have not been applied in any wastewater treatment process including the BNR processes. An additional benefit of the twin-LSFB/GLSFB system, which includes the LSCFB/GLSCFB, is that it has two separate fluidized beds where two separate processes such as aerobic and anoxic processes, can be accommodated in the same system.

The BNR-Twin-LSFB (hereafter simply referred to as BNR-LSFB) system has two fluidized beds interconnected to form a solids circulation system: Fluidized Bed I where both liquid and particles move co-currently upwards and Fluidized Bed II where the liquid and air flows upwards in countercurrent with the downflowing particles. Some particles circulate from Fluidized Bed I to Fluidized Bed II through a conduit at or near the top ends of the fluidized beds, and some other particles circulate back from Fluidized Bed II to Fluidized Bed I through a conduit at or near the bottom ends of the fluidized beds. Therefore, particles recirculate between the two fluidization columns. In the above instance, Fluidized Bed I is a liquid-solid fluidized bed, while Fluidized Bed II is a gas-liquid-solid fluidized bed.

The various embodiments described in general terms above will now be described in more detail hereinafter.

1) Generic System

Referring to FIG. 4, an embodiment of a liquid-solid fluidized bed biological nutrient removal system shown generally at 100 is comprised of a pair of fluidized beds, a first fluidized bed 10 which is a riser column or bed and a second fluidized bed 30 which is a downer column or bed, which are named according to the movement direction of the particles. Beds 10 and 30 are interconnected at their adjacent ends by connecting pipes 52 and 54 that allow the circulation of solids and liquids between the two columns 10 and 30.

In the first fluidized bed (the riser column) 10, the solid bacteria coated particles 50 are transferred from the second fluidized bed 30 via the bottom connection pipe 52 and enter the first bed 10 adjacent to the lower end 12 of the bed 10 whereupon they flow upward in co-current relation with a first fluidizing fluid 20 (such as a mixture of the raw waste water feed 22 and the recycle stream 24 from the top of the first fluidized bed 10) which enters the bed 10 through a liquid distributor 16 adjacent to the lower end 12 of the bed 10 and flows upward through the bed 10. The first fluidized bed 10 as described is a liquid-solid fluidized bed which may operate in either the conventional particulate fluidization regime (PFR) or the fast fluidization regime (FFR). Optionally, gas feed (not shown in FIG. 4) may also be injected into the lower end 12 of the bed 10, to form a gas-liquid-solid fluidized bed operated in either the PFR or the FFR regimes.

The second fluidized bed (the downer column) 30 is a conventional counter-current flow liquid-solid bed wherein solid particles 50 (for example, but not limited to, lava rock particles, zeolite, resin, silica sol-gel or other biomass carriers) enter from the upper connecting pipe 54 near the top 34 of the bed 30 and flow downward and a second fluidizing fluid 40 such as the recycled effluent 44 enters the bed 30 at the lower end 32 of the bed 30 and flows upward in a counter-current relationship with respect to the particles 50. Additional gas 56 such as air may be injected into the bottom of the bed 30, through a gas distributor 58. The gas forms bubbles in the bed 30 and flow upwards co-currently with the second fluidizing liquid stream 40. Because of the gas injection, the second fluidized bed in this case is actually a gas-liquid-solid fluidized bed. Without the gas injection, the second fluidized bed 30 will be a liquid-solid fluidized bed.

As stated above, the solid particles 50 from the riser bed 10, together with some entrained liquid from the riser 10, enter the downer column at a position 38 near the top 34 of the downer bed 30 through the upper connecting pipe 54 and travel downward through the bed 30. After they have traversed the fluidized bed 30 the particles 50 enter into the lower connecting pipe 52, together with some entrained liquid and sloughed biomass, and are introduced into the riser column 10. The circulation rate of the bacteria coated solid particles 50 may be controlled by a mechanical valve or similar devices (not shown) located in the bottom return pipe 52.

The downer column 30 includes the aerobic zone while the riser column 10 includes the anoxic zone and the anaerobic zone similar to that shown in FIG. 3. In the aerobic zone, wastewater rich in organic matter as well as ammonia is biodegraded in the presence of oxygen from the input air, to carbon dioxide, water, and nitrates etc. by the bacteria mainly immobilized on the solid particles. The continuous flow of air and wastewater ensures the sustainability of the aerobic biomass. In the anoxic zone, where the influent wastewater is mixed with the recycled nitrified activated sludge effluent from the aerobic zone, denitrification prevails. Nitrates in the nitrified stream from the aerobic section of the downer column 30 is used as a source of oxygen to meet the oxygen demand of the wastewater. The wastewater feed and the decaying biomass sloughed from the aerobic section biofilm provide the carbon source for denitrification. The anaerobic zone is formed as the influent biodegradable wastewater constituents exert an oxygen demand above the anoxic zone. Since this demand is not met due to lack of oxygen/air inflow, anaerobic conditions prevail. In the anaerobic zone, stored phosphorus is released and volatile fatty acids are stored for further degradation in the aerobic zone.

During the operation, biomass carriers with biofilm on them flow from the anaerobic zone in the riser column 10 to top region of the downer column 30. After the aerobic process, biomass carriers with biofilm on them in the downer 30 are transported into the base of the riser 10 through the bottom return pipe 52 to make up the particles 50 flowing upwards along the riser 10. The bottom connecting pipe 52 may operate in a moving packed bed or a dense transport bed state but can also be operated in a semi-fluidized or particulate fluidized state. The upper connecting pipe 54 may operate as a dilute transport line but may also be in a semi-fluidized state or operated as a dense transport bed or a moving packed bed. In a "dilute transport" line, particles are uniformaly suspended and also carried by the liquid, in a "dense transport" line, particles are suspended but not carried by the liquid. In a smi-fluidized state, only some particles are suspended and the rest sit at the bottom but can be periodically stirred up by the liquid flow. In a moving packed bed, particles are essentially packed together, but moving towards one direction of the line.

The effluent 26 from the top of the riser 10 is recycled to form part of the first fluidizing fluid 20 which, together with the raw wastewater feed 22 and some of the nitrified effluent from the aerobic zone from pipe 52 and possibly a portion 18 of effluent recycle 44 from the downer 30, then flow upwards along with particles 50 in co-current relationship through the riser bed 10. In the top region of the riser, most of the first fluidizing fluid 20 is removed as riser effluent 26 and the rest flows into the downer 30 together with the particles flowing through the upper connecting pipe 54. If additional gas is injected to the bottom 12 of the riser column 10, the gas will travel co-currently upwards, together with the liquid, to fluidize the solid particles 50. Such gas will be separated out in the top of the riser column 10.

On the downer (aerobic) side of the system in downer column 30, the recycle stream 44 from the downer effluent 46 as described above forms the second fluidizing fluid 40 and enters at the bottom of the downer 30. The second fluidizing fluid 40, along with the injected gas 56 (preferably, but not limited to air) stream, fluidizes the particles 50 inside the downer column and travels, in a countercurrent relationship to the particles 50, through the downer column 30 and leaves at the top of column 30 as the downer effluent 46. Part of the effluent 46 is released as treated water 48 and part of the stream is recycled back to the bottom of the downer column 30 as stream 44 to sustain the operation of the process, with possibly another portion 18 recycled to the bottom of the riser 10 to join the first fluidizing fluid 20. This recycle stream 18 from the top of the downer 30 to the bottom of the riser 10 is, if adopted, to simulate recirculation of nitrified mixed liquor from the aeration tank to the anoxic tank in a conventional activated sludge type BNR system. In the top dilute region of the downer column 30, most entrained particles 50 and sloughed sludge formed during the process settle back by gravity, separating them from the downer effluent. No consumed air will be separated out in the top of the downer 30.

2) Configuration of System in which Both Fluidized Beds (Riser Column and Downer Column) are Operated in the Conventional Particulate Fluidization Regime.

FIG. 5 shows the schematic diagram of another embodiment of the twin liquid-solid fluidized bed biological nutrient removal system where both fluidized beds are operated as conventional particulate liquid-solid (or gas-liquid-solid) fluidized beds. As shown in FIG. 5, the present invention provides a liquid-solid fluidized bed biological nutrient removal system shown at 200 comprised of a pair of fluidized beds, including a first fluidized bed 210 which is a riser column and a second fluidized bed 230 which is a downer column, which are named according to the movement direction of the particles. Beds 210 and 230 are interconnected at their adjacent ends by bottom connecting pipe 52 at the lower end and upper connecting pipe 54 at the upper end that allow the circulation of solids between the two columns 210 and 230.

The first fluidized bed 210 is a conventional liquid-solid fluidized bed operated in the particulate fluidization regime, where the first fluidization velocity is below the transition velocity into the fast fluidization regime. In the first fluidized bed (the riser) 210, the solid particles 50 transferred from second fluidized bed 230 via the bottom connection pipe 52 enter the bed 210 adjacent to the lower end 12 of the bed 210 and flow upward in co-current relation with a first fluidizing fluid 20 (such as a mixture of the raw waste water feed 22 and the recycle 24 from the top of the first fluidized bed 210) which enters the bed 210 through a liquid distributor 16 adjacent to the lower end 12 of the bed 210 and flows upward through the bed 210.

As with system 100 in FIG. 4, the circulation rate of the solid particles 50 may be controlled by a mechanical device (such as a pump or propeller) 51 installed in the bottom return pipe 52 to provide further control of the particle flowrate from the downer 230 to the riser 210.

The second fluidized bed (the downer) 230 is a conventional counter-current flow liquid-solid bed wherein solid particles 50 (for example, but not limited to, lava rock particles, zeolite, resin, silica sol-gel or other biomass carriers) enter from the upper connecting pipe 54 near the top 34 of the bed 230 and flow downward and a second fluidizing fluid 40 such as the recycled effluent 44 enters the bed 230 at the lower end 32 of the bed 230 and flows upward in a counter-current relationship with respect to the particles 50. Additional gas 56 such as air may be injected into the bottom of the bed 230, through a gas distributor 58. Such gas forms bubbles in the bed 230 and flow upwards co-currently with the second fluidizing liquid. Because of the gas injection, the second fluidized bed in this case is actually a gas-liquid-solid fluidized bed. Without the gas injection, the second fluidized bed will be a liquid-solid fluidized bed.

A mechanical device (such as a pump or propeller) 53 may be optionally installed in the top connecting pipe 54 to control the circulation rate of the solid particles 50 from the riser 210 to the downer 230.

For a liquid-solid (the first fluidized bed 210 in this case) and a gas-liquid-solid fluidized bed (the second fluidized bed 230 in this case) operating in the conventional particulate fluidization regime, both the first and the second fluidized beds have two regions: the bottom dense phase region 62 and 72 where most particles reside, and the top dilute phase region 64 and 74 where only a small number of particles entrained from the dense phase region are present. The relative locations of the boundaries between those two regions in each of the first and second fluidized beds will depend on the amount of particles present in each bed and the superficial liquid (and gas, if present) velocities in each bed. In addition, the particles in the dilute phase region 64 and 74 also have the tendency to settle back into the dense phase region 62 and 72 so that very few particles escape from the top of the two fluidized beds. As such, no significant particle loss occurs without a liquid-solid separator. In the top dilute region 74 of the second fluidized bed 230, sloughed sludge also tends to settle back into the dense phase region 72, but given the lighter density of the sloughed sludge than the carrier particles 50, they are likely to concentrate at the interface between the dense and the dilute phases of the second fluidized region, where an outlet 70 may be installed to remove waste the sludge from time to time.

As stated above, the solid particles 50 from the riser 210, together with some entrained liquid from the riser 210, enter the downer column 230 at a position 42 near the top 34 of the downer 230 through the upper connecting pipe 54 and travel downward through the downer bed 230. After they have traversed the fluidized bed 230 the particles 50 enter into the lower connecting pipe 52, together with some entrained liquid and sloughed biomass, and are introduced into the riser column 210. Nitrified activated sludge from the aerobic zone, either attach on the carrier particles or as particulates themselves, also flows from the downer into the riser through the same lower connecting pipe 52. If one wants to increase the solids loading (the concentration of the particles) in the liquid-solid flow inside the lower connecting pipe 52, a collecting conduit 76 as shown in FIG. 5 may be optionally added at the mouth of the lower connecting pipe 52 on the downer side, to collect more particles at the mouth of the connecting pipe 52. The collecting conduit 76 may have a funnel shape with a larger cross-section at the top than at the bottom, to allow some particles settling inside. Additionally, a mechanical device 51 such as a sludge pump or propeller may be installed in the lower connecting pipe 52 to ensure and control the flow of the liquid-solids from the downer 230 to the riser 210. Such device 51 may be a simple propeller device or a peristaltic pump, a double-diaphragm pump, or a screw pump and this applies to all embodiments of the system disclosed herein. The addition of such a control device will increase the operation flexibility of the system.

Likewise, if one needs to ensure a sufficient amount of solid particles 50 being transported from the riser 210 to the downer 230 through the upper connecting pipe 54, so as to provide a minimum solids circulation between the two fluidized beds, a collecting conduit 66 as shown in FIG. 5 may be optionally added at the mouth of the upper connecting pipe 54 on the riser side. Preferably, this collecting conduit 66 extend into the dense phase of the first fluidized bed where the particle concentration is much higher, but it may extend to other areas as well depending on the particular application for which the system is configured. Optionally, a mechanical device 53 such as a propeller or a pump may also be installed in the upper connecting pipe 54 or somewhere in the collecting conduit to increase and control the flow of the liquid-solids from the riser 210 to the downer 230. This device draws particles from the riser 210 to the downer 230 and also maintains a proper solids flow and therefore proper operation stability.

With an even more extended collecting conduit 76 in the second fluidized bed 230 (the downer), or through other type of internal or external piping structures, it is also possible to collect particles from other places of the second fluidized bed (the downer 230), for example from the middle of the dense phase region, and to circulate them into the first fluidized bed (the riser). Likewise, the collecting conduit 66 in the first fluidized bed 210 (the riser) can also be extended to other places of the first fluidized bed 210 to collect particles for recirculation into the second (downer) fluidized bed 230.

As described before, the downer column 230 includes the aerobic zone while the riser column 210 includes the anoxic zone and the anaerobic zone. In the aerobic zone, wastewater rich in organic matter as well as ammonia is biodegraded in the presence of oxygen from the input air, to carbon dioxide, water, and nitrates etc. by the bacteria mainly immobilized on the solid particles. The continuous flow of air and wastewater ensures the sustainability of the aerobic biomass. In the anoxic zone, where the influent wastewater is mixed with the recycled nitrified activated sludge effluent from the aerobic zone, denitrification prevails. Nitrates in the nitrified stream from the aerobic section of the downer column 230 is used as a source of oxygen to meet the oxygen demand of the wastewater. The wastewater feed and the decaying biomass sloughed from the aerobic section biofilm provide the carbon source for denitrification. The anaerobic zone is formed as the influent biodegradable wastewater constituents exert an oxygen demand above the anoxic zone. Since this demand is not met due to lack of oxygen/air inflow, anaerobic conditions prevail. In the anaerobic zone, stored phosphorus is released and volatile fatty acids are stored for further degradation in the aerobic zone.

During the operation, biomass carriers or particles 50 with biofilm on them are flowed from the anaerobic zone in the riser column 210 to the upper region of the downer column 230. After the aerobic process, biomass carriers with biofilm on them in the downer 230 are transported into the base of the riser 210 through the bottom return pipe 52 to make up the particles 50 flowing upwards along the riser 210. The bottom connecting pipe 52 may operate in a moving packed bed or a dense transport bed state but can also be at a semi-fluidized or particulate fluidized state. The upper connecting pipe 54 may operate as a dilute transport line or at a particulate fluidized state but can also be at a semi-fluidized state or as a dense transport bed or a moving packed bed. With the installation of a mechanical device such as a pump, a propeller or a similar device in the upper and lower connecting pipes 52 and 54, those two connecting pipes tend to operate at the particulate fluidized state with good liquid-solid suspension flow.

The effluent 26 from the top of the riser 210 is recycled to form part of the first fluidizing fluid 20 which, together with the raw wastewater feed 22 and some of the nitrified effluent from the aerobic zone from pipe 52, plus possibly a portion 18 of the downer effluent recycle 44 from the top of the downer 230, then flow upwards along with particles 50 in co-current relationship through the riser bed 210. In the upper region of the riser, most of the first fluidizing fluid 20 is removed as riser effluent 26 and the rest flows into the downer 230 together with the particles flowing through the upper connecting pipe 54. If additional gas is injected to the bottom 12 of the riser column 210, the gas will travel co-currently upwards, together with the fluid, to fluidize the solid particles. Such gas will be separated out in the top of the riser 210.

On the downer (aerobic) side of the system, the recycle stream 44 from the downer effluent 46 as above described forms the second fluidizing fluid 40 and enters at the bottom of the downer 230. The second fluidizing fluid 40, along with the injected gas (mostly likely air) stream 56, fluidizes the particles inside the downer column and travels, in a counter-current relationship to the particles 50, through the downer column 230 and leaves at the top of column 230 as the downer effluent 46. Part of the effluent 46 is released as treated water 48 and part of which recycled back to the bottom of the downer column 230 to sustain the operation of the process, with possibly another portion 18 recycled to the bottom of the riser to become part of the first fluidizing fluid 20. This recycle stream 18 from the top of the downer 230 to the bottom of the riser 210 is, if adopted, to simulate recirculation of nitrified mixed liquor from the aeration tank to the anoxic tank in a conventional activated sludge type BNR system. In the upper region of the downer column 230, most entrained particles 50 and sloughed sludge formed during the process settle back by gravity, separating them from the downer effluent.

It will be appreciated by those skilled in the art that the roles of the two columns may be reversed, namely the first fluidized bed (riser) 210 may be used for aerobic process and the second fluidized bed (downer) 230 may be used for the anaerobic and anoxic processes.

3) Configuration of System in which the Riser is Operated in the Fast Fluidization Regime and the Downer is in the Conventional Particulate Fluidization Regime FIG. 6 shows a schematic diagram of an embodiment of the twin liquid-solid fluidized bed biological nutrient removal system where the first fluidized bed is a fast fluidized bed and the second fluidized bed is a conventional particulate (gas-) liquid-solid fluidized bed, so that the system is a (gas-)liquid-solid circulating fluidized bed biological nutrient removal system.

Referring to FIG. 6 the present invention provides a liquid-solid circulating fluidized bed biological nutrient removal system shown generally at 400 comprised of a pair of fluidized beds, including a first fluidized bed 412 which is a riser column (anoxic and anaerobic bed), and a second fluidized bed 410 which is a downer column (aerobic bed), which are named according to the movement direction of the particles, a liquid-solid separator 446 on the top of the riser and a similar clarifier 476 on the top of the downer column 410. Both the separator 446 and the clarifier 476 are optional but can be helpful in preventing significant particle carry-over through the effluents. Fluidized beds 410 and 412 are interconnected at their adjacent ends by connecting pipes that allow the circulation of solids between the two columns.

The first fluidized bed 412 is a riser fluidized bed wherein the solid particles 50 transferred from second bed 410 via the bottom connection pipe 442 enter the bed 412 adjacent to the lower end 426 of the bed 412 and flow upward in co-current relation with a first fluidizing fluid 428 (such as a mixture of the raw waste water feed stream 472 and the recycle 474 from the liquid-solid separator 446 located at the top of the riser 412) which enters the bed 412 in the illustrated arrangement through nozzle 430 and inlet 432 both adjacent to the lower end 426 of the bed 412 and flows upward through the bed 412 carrying the particles 50 in its flow. Particles 50 have bacteria immobilized thereon. The first fluidized bed 412 as described is a fast liquid-solid fluidized bed operated in the liquid-solid fast fluidization regime. Optionally, gas feed (not shown in FIG. 6) may also be injected into the lower end 426 of the bed 412, to form a gas-liquid-solid fluidized bed operated in the gas-liquid-solid fast fluidization regime.

The first fluidized bed 412 includes a distributor at the bottom end thereof which divides the incoming stream of the fluid 428 (which can be a mixture of feed 472 and recycle 474) into two sub-streams: a primary stream 460 and an auxiliary 462 streams. The primary stream 460 is introduced through nozzle 430 which projects into the first fluidized bed column 412. This design very advantageously increases the pressure drop across the bottom solids return pipe 442 and makes the system more stable. The auxiliary stream 462 is introduced into the bottom 426 of the first fluidized bed 412 through a perforated plate inlet 432. The function of the auxiliary stream 462 is to stir up the particles 50 at the bottom of the first fluidized bed 412 to be entrained up the first fluidized bed by the combination of the primary and auxiliary liquid streams 460 and 462. The two streams 460 and 462 may also be combined into a single stream and fed through a single distributor at the bottom end 426 of the second fluidized bed 410. The bacteria coated particles 50 flowing from the second fluidized bed 410 through the lower connecting pipe 442 flows into the first fluidized bed 412 near its bottom end 426.

The second fluidized bed 410 on the other hand is a conventional counter-current flow liquid-solid wherein bacteria coated solid particles 50 (for example, but not limited to, lava rock particles, zeolite, resin, silica sol-gel or other biomass carriers) enter from the upper connecting pipe 419 near the top of the bed 410 as indicated by the line 417 and flow downward and a second fluidizing fluid 420 such as the recycled effluent 444 enters the bed 410 as indicated schematically at 422 at the lower end 424 of the bed 410 and flows upward in a counter current relationship with respect to the particles 50. Additional gas 482 such as air may be injected into the bottom of the bed 410, through a gas distributor 480. Such gas forms bubbles in the bed 410 and flow upwards co-currently with the second fluidizing liquid. Because of the gas injection, the second fluidized bed 410 in this case is actually a gas-liquid-solid fluidized bed. As the second fluidized bed 410 operates in the conventional particulate fluidization regime, it will have two regions: the bottom dense phase region 490 where most particles 50 reside, and the top dilute phase region 492 where only a small number of particles 50 entrained from the dense phase region 490 are present. In addition, the particles 50 in the dilute phase region 492 also have the tendency to settle back into the dense phase region 490 so that very few particles 50 escape from the top of the second fluidized bed 410. As such, no significant particle loss occurs without a liquid-solid clarifier. Nonetheless, a clarifier 476 may be added at the top of the second fluidized bed 410 to further ensure more particles and sloughed sludge entrained by the upflowing fluid(s) to settle back into the second fluidized bed 410 in order to minimize the loss of particles 50 through the effluent.

As stated above, the bacteria coated solid particles 50 enter the downer column 410 at inlet 417 and travel downward through the bed 410. After they have traversed the fluidized bed 410 the particles 50 enter into the lower connecting pipe 442, together with some entrained liquid, and are introduced into the first fluidized bed 412.

The column 410 includes the aerobic zone while the column 412 includes the anoxic zone and the anaerobic zone. In the aerobic zone, wastewater rich in organic matter as well as ammonia is biodegraded in the presence of oxygen from the input air, to carbon dioxide, water, and nitrates by the bacteria mainly immobilized on the solid particles 50. The continuous flow of air and wastewater ensures the sustainability of the aerobic biomass. In the anoxic zone, where the influent wastewater is mixed with the recycled nitrified activated sludge effluent from the aerobic zone, denitrification prevails. Nitrates in the nitrified stream from the aerobic section of column 410 is used as a source of oxygen to meet the oxygen demand of the wastewater. The wastewater feed and the decaying biomass sloughed from the biofilm coated particles 50 in the aerobic section in column 412 provide the carbon source for denitrification. The term "sloughed" means detached and refers to loose biomass entrained in the effluent, not those on the particles.

The anaerobic zone is formed as the influent biodegradable wastewater constituents exert an oxygen demand above the anoxic zone. Since this demand is not met due to lack of oxygen/air inflow, anaerobic conditions prevail. In the anaerobic zone, stored phosphorus is released and volatile fatty acids are stored for further degradation in the aerobic zone.

During operation, biomass carriers with biofilm on them from the aerobic process are transported into the base of the first fluidized bed 412 through the bottom return pipe 442 to make up the particles 50 entrained up along the first fluidized bed 412. The bottom solids return pipe 442 operates most of the time as a packed moving bed but can also be at a semi-fluidized or conventionally fluidized state.

In the biological nutrient removal liquid-solid circulating fluidized bed (BNR-LSCFB) waste water treatment system of the present invention, the circulation rate of the solid particles 50 may be controlled by a butterfly valve 470 or another type of mechanical valve located in the bottom return pipe 442. The splitting of the feed stream to the first fluidized bed 412 into two streams 460 and 462 with the first stream mobilizing the particles in the bottom section of the riser forms a further hydraulic valve that can also control the circulation rate of the solid particles 50. There are other possible types of hydraulic valves such as loop seal etc. (not shown). Either a mechanical valve or a hydraulic valve or both can be used to control the flow rate of the solid particles 50. Normally, a mechanical valve is preferred over a hydraulic valve because the mechanical valve usually provides a higher and more stable pressure drop across the return pipe 442 and therefore makes the system more stable and also makes it easier to maintain a pressure balance between the two columns. The auxiliary liquid stream 462, if used together with the mechanical valve, provides additional control of the circulation rate of the solid particles 50.

The recycle stream 420 from the effluent 444 enters at the bottom of the second column 410 and travels, together with the injected gas (mostly likely air) stream, in a countercurrent relationship to the particles 50 through the downer column 410 and leaves at the top of column 410 as indicated at 444. In the upper dilute region 492 of the column 410, the entrained particles 50 and sloughed sludge gradually return back to the bottom dense region 490 of the column 410, before the gas and fluid exit the column. If installed, the clarifier 476 at the top of the second fluidized bed 410 further separates out the entrained particles 50 and sloughed sludge formed during the process, and returns them back to lower portion of the bed 410. The clarifier 476 also periodically discharges the sloughed sludge through a port (or ports) 445. The fluid exiting from column 410 at 444 is the effluent, part of which is released as treated water and part of which recycled as the second fluidizing fluid 420 back to the bottom of the downer column 410 to sustain the operation of the process.

The first fluidizing fluid 428 (which is a combination of raw waste water feed 472 plus the recycle stream 474 from the outlet of the riser column 412, (or, if installed, from the liquid-solid separator 446 at the top of the riser column 412) plus some of the recycled effluent 444 from the second column returned to the first fluidized column 412 as nitrified effluent recycle stream 418, and the particles 50 along with some of the nitrified effluent from the aerobic zone from pipe 442 travel in co-current relationship upward through the bed 412 and then enter liquid-solid separator 446 (such as a settler) having a top fluid overflow outlet 452 through which most of the first fluidizing fluid 428 is removed and an outlet 450 near the bottom of the separator 446 through which the particles 50 and some of the fluid from the fluidized bed 412 enter the upper connecting pipe 419. These solid particles 50 from the separator 446, together with some the above mentioned entrained liquid, flow down in the upper connection pipe 419 to the inlet 417 in the downer column 410. If additional gas is injected to the bottom 426 of the riser column 412, the gas will travel co-currently upwards, together with the fluid, to fluidize the solid particles. Such gas will be separated out in the top separator 446.

In the treated effluent stream, such as that of stream 444 in the embodiment shown in FIG. 6, there may be particulate materials such as colloidal and suspended biomass as well as possibly a small amount of fine carrier particles. Another clarifier in addition to clarifier 476 can be optionally added to further strip off those particulate matters. Sludge will accumulate inside such a clarifier and then be taken out, normally from the bottom or near the bottom of the clarifier. Final effluent normally leaves as an overflow from the clarifier, although many other arrangements can also be made.

Applications of the Present Invention

The application of the present invention will be further described below in relation to wastewater treatment, but it may be also used in other applications, for example effluent treatment from a host of industrial processes.

The present invention will now be illustrated using the following non-limiting example.

EXAMPLE

A flow diagram illustrating the fixed-film BNR process using the Twin-LSFB system 200 (FIG. 5) of the present invention is illustrated in FIG. 2. In connection with FIG. 5, the aerobic process takes place in the downer bed 230 and the anoxic process takes place in the lower part of the dense phase region of the riser bed 210 and the anaerobic process takes place in the upper part of the dense, phase region of the riser bed 210. Raw wastewater 22 (primary influent or primary effluent) is first mixed with the anoxic/anaerobic effluent recycle stream 24 from the top of the riser 210 and then fed into the bottom of the riser bed 210 where the activated sludge loaded on the recirculating solid particles along with some previously nitrified wastewater from the aerobic process in the downer bed 230 is also mixed with the raw wastewater 22 and the anoxic/anaerobic effluent recycle stream 24. The fluid containing the raw wastewater 22, effluent recycle stream 24, the previously nitrified wastewater and the solid particles loaded with microbes, flow co-currently up the riser 210 while contacting each other. The riser column 210 operates in the liquid-solid particulate fluidization regime and provides excellent interfacial mass transfer between the liquid and the biofilm on the particles. In the lower section of the dense phase region of the riser 210, anoxic conditions that are conducive to denitrification prevail.

The carbon source for denitrification in the bottom half of the riser can either be a portion of the wastewater feed or the decaying biomass sloughed from the downer bed biofilm, or both. Then, wastewater flows further upwards into the anaerobic zone maintained in the upper part of the dense phase region of the riser, where stored phosphorus is released and volatile fatty acids are stored for further degradation in the aerobic zone. The elimination of nitrates upstream of the anaerobic zone will greatly enhance phosphorus release and subsequent uptake in the aerobic downer bed 230. It is important to note that since liquid-solid separation and subsequent solids recycle to the downer bed 230 occurs immediately after the anaerobic phase, enhanced phosphorus uptake in the aerobic downer bed will also likely take place.

In the dilute phase region in the upper part of the riser bed 210, the solid particles loaded with microbes are separated out from the liquid stream and, along with some effluent liquid, are introduced into the top of the downer bed 230 through the upper connecting pipe 54. The recirculated solids from the riser 210 join in the upper dilute phase region of the downer bed 230 and flow down the downer bed 230. A fraction of the effluent 46 from the top of the downer 230 forms the effluent recycle stream 44 and the remaining part 48 exits the system as treated effluent. A majority part of the recycle stream 44 equivalent to approximately 2-15 times of the wastewater feedrate is recycled back to the bottom of the downer bed 230 and possibly another portion 18 of the effluent recycle stream 44 is recycled to the bottom of the riser bed 210.

The recycled liquid 44 is primarily used to fluidize the downer bed 230 so that it is introduced into the downer bed 230 from the bottom, near the injection port for air (or oxygen containing gas). By provision of air in the downer bed 230 and control of air flowrate, and by control of the recycled liquid flowrate, the aerobic zone can be well maintained in the downer bed 230 under the conventional gas-liquid-solid three-phase particulate fluidization regime. The solids attached with biomass flow by gravity to the bottom of the downer bed 230, and then into the bottom of the riser 210 through the bottom connecting pipe 52. Some of the sloughed sludge formed during the process is periodically discharged from the aerobic zone through outlet 70 at or above the interface of the dense phase region 72 and dilute phase region 74 of the downer 230. The system can be designed such that the fluid flow from the downer bed to the bottom of the riser 18 is of an appropriate recycle flowrate (e.g., 4-fold the influent flow rate), to simulate recirculation of nitrified mixed liquor from the aeration tank to the anoxic tank in a conventional activated sludge type BNR system.

FIG. 2 can also be used in conjunction with FIG. 6 to illustrate the fixed-film BNR process using the LSCFB system of the present invention. In connection with FIG. 6, the aerobic process takes place in the downer bed 410 and the anoxic process takes place in the lower part of the riser bed 412 and the anaerobic process takes place in the upper part of the riser bed 412. One alternative is to have the anoxic process in the lower part of the riser 412 and the anaerobic in the upper part of the riser 412. In this case, raw wastewater 472 (primary influent or primary effluent) is first mixed with the anoxic/anaerobic effluent recycle stream 474 from the liquid-solid separator 446 at the top of the riser, plus some of the recycled effluent 444 from the downer bed 410 returned to the riser bed 412 as nitrified effluent recycle stream 418, and then fed into the bottom of the riser bed 412 where the activated sludge loaded on the recirculating solid particles along with some previously nitrified wastewater from the aerobic process in the downer bed 410 is also mixed with the raw wastewater 472 and the anoxic/anaerobic effluent recycle stream 474. The fluid containing the raw wastewater, effluent recycle stream 474, the previously nitrified wastewater and the solid particles loaded with microbes, flow co-currently up the riser 412 while contacting each other. The riser column 412 operates in the liquid-solid fast fluidization regime and provides excellent interfacial mass transfer between the liquid and the activated sludge, thus significantly enhancing the process intensity. In the lower section of the riser 412, anoxic conditions that are conducive to denitrification prevail. The carbon source for denitrification in the bottom half of the riser can either be a portion of the wastewater feed or the decaying biomass sloughed from the downer bed biofilm, or both. Then, wastewater flows further upwards into the anaerobic zone maintained in the upper half of the riser, where stored phosphorus is released and volatile fatty acids are stored for further degradation in the aerobic zone. The elimination of nitrates upstream of the anaerobic zone will greatly enhance phosphorus release and subsequent uptake in the aerobic downer bed 410. It is important to note that since liquid-solid separation and subsequent solids recycle to the downer bed 410 occurs immediately after the anaerobic phase, enhanced phosphorus uptake in the aerobic downer bed will also likely take place.

In the liquid-solid separator 446 at the top of the riser 412, the solid particles loaded with microbes are separated out from the liquid stream and, along with some effluent liquid also from the liquid-solid separator 446, are introduced into the top of the downer bed 410 through the upper connecting pipe 419. Treated wastewater that comes with the recirculated solids from the riser 412 is joined at the top inlet 417 of the downer bed 410 by recycled effluent from downer column 410 flowing up through the downer bed 410. Part of the combined stream 444 equivalent to approximately 5 to 15 times of the wastewater feedrate is recycled into the downer bed 410 as the second fluidizing fluid 420 and the remaining part 444 exits the system as treated effluent. The recycled liquid 420 is also used to fluidize the downer bed 410 so that it is preferably introduced into the downer bed 410 from the bottom, near the injection port for air (or oxygen containing gas). By provision of air in the downer bed 410 and control of air flowrate, and by control of the recycled liquid flowrate, the aerobic zone can be well maintained in the downer bed 410 under the conventional gas-liquid-solid three-phase particulate fluidization regime. The solids attached with biomass flow by gravity to the bottom of the downer bed 410, and then into the riser bottom through the bottom inclined connection pipe 442. Some of the sloughed sludge formed during the process is periodically discharged from the aerobic zone through outlet 445 in clarifier 476. The system can be designed such that the fluid flow from the downer bed to the bottom of the riser 412 is of an appropriate recycle flowrate (e.g., 4 folds the influent flow rate), to simulate recirculation of nitrified mixed liquor from the aeration tank to the anoxic tank in a conventional activated sludge type BNR system.

Another alternative is to have the anoxic zone in the upper zone located above the anaerobic zone in the first fluidized bed 412. In such a case, all of the waste water feed stream 472 is fed or injected at a point 416 midway in the column 412 directly to the upper zone, as shown by the dotted line in both FIGS. 2 and 6 (478). In such a case, the effluent recycle stream 474 from the bed 412 is still recycled to the bottom of the riser 412, to fluidize the bottom portion of the riser. Optionally, a small portion of the riser effluent recycle stream 474 can flow into the first fluidized bed 412 between the anaerobic zone and the anoxic zone, and the remaining portion of the riser effluent recycle stream 474 still flow into the first fluidized bed 412 near or at the bottom of the first fluidized bed 412, below the anaerobic zone.

This fixed-film biological nutrient removal (BNR) Twin-LSFB process combines the advantages of the suspended growth BNR process with those of the fixed-film in a single unit. In addition to the advantages of the fixed-film processes with respect to sludge settle-ability and accordingly to the reduced size of the clarifiers for liquid-solid separation, the LSFB re-circulates attachment media with high settling velocities, such that only a small liquid-solid separation tank is needed instead of a separate clarifier. Furthermore, due to fluidization, the BNR-LSFB can handle both soluble and particulate-laden wastewater, thus possibly eliminating the need for primary clarifiers. More specifically, the BNR-LSFB system disclosed herein offers the following advantages over the widely employed conventional activated sludge systems and the more recently developed suspended growth BNR systems.

1) A much smaller area and very compact reactor sizes, due to higher biomass density per unit bioreactor volume and the elimination of both primary and secondary clarifiers;
2) the minimization of operational labour requirements with the elimination of routine tasks such as solids analysis in the aeration tank and the return of activated sludge, cleaning of clarifier weir launders, wasting sludge, control of chemical dosing and maintenance of chemical feed systems;
3) an enhanced process stability as a result of better biosolids retention;
4) the capability to handle simultaneously soluble and particulate wastes due to the suspension of particulates within the fluidized-beds;
5) less vulnerability to shock loadings of toxicants and inhibitory substances as a result of lower toxicant-to-biomass ratios than in suspended-growth;
6) the minimization/elimination of chemical addition for phosphorus removal;
7) a significant reduction in sludge generation and the minimization of chemical sludge compared to the activated sludge system due to lower bacterial yields in the anoxic tank, and the minimization of biological sludge compared to the suspended growth BNR system due to its operation at a much longer solids residence time and accordingly much higher biomass decay rates;
8) a substantial reduction in oxygen requirements and thus major savings in energy requirements;
9) the potential reduction in organic carbon requirements for nutrient-removal due to enhanced utilization of particulate substrates as a result of better entrapment in the fluidized bed as well as decaying biofilm as a carbon source.

In summary, the process offers the potential to achieve a highly treated effluent quality at significant cost savings in capital and operation/maintenance costs compared to existing technologies, with remarkable process stability. In addition, while this fixed-film BNR LSFB process is applicable to any municipal wastewater treatment application, it is particularly advantageous for treatment of wastes from industries that very often have space limitations and special needs. For example, this technology can be used to treat specific concentrated streams of industrial wastewater as well as to provide end-of-pipe treatment to the overall wastewater. The other potential principal application of the technology would be small communities and new developments, which have limited financial resources, given the drastically reduced cost, space, and energy requirements.

In studies carried out by the inventors, soluble COD concentrations in the effluent ranging from 4 to 20 mg/L were obtained at varying COD loading rates; ammonia nitrogen removal efficiencies averaged in excess of 99% at a minimum total hydraulic retention time (HRT) of 2.2 hours over a temperature range of 25 C.° to 28 C.°. Effluent nitrate nitrogen concentration of less than 5 mg/L was achieved by increasing nitrified liquid recycle rate. No nitrite accumulation could be observed either in the anoxic bed or in the aerobic bed. The BNR-LSFB appears to be not only an excellent alternative to conventional activated sludge type BNR technologies but also capable of processing much higher loadings and suitable for industrial applications.

It will be appreciated that the apparatus and process of the present invention are not limited to having the aerobic section in the downer column and the anoxic and anaerobic sections in the riser column and that these may be reversed so that the aerobic section with gas injection may be located in the riser column and the anoxic and anaerobic sections may be in the downer column.

It will also be appreciated that it is also possible and in some cases beneficial to use more than two fluidized beds for the same fixed-film biological nutrient removal (BNR) process. For example, FIG. 7 illustrates an embodiment where three fluidized beds are incorporated together, Fluidized Bed I for anoxic process, Fluidized Bed III for anaerobic process, and Fluidized Bed II for aerobic process.

It will be understood by those skilled in the art that the relative sizes of the riser bed and downer bed are dictated by the wastewater characteristics and treatment goals, and accordingly should specific requirements necessitate different relative sizing, the technology can readily be adapted to have an aerobic riser and an anoxic/anaerobic downer.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiments illustrated. It is intended that the scope of the invention be defined by all of the embodiments encompassed within the following claims and their equivalents.

REFERENCES

1 Kunii, D. and Levenspiel, O., Fluidization Engineering, Butterworth-Heinemann, Stoneham, Mass., USA (1991).
2 Weber, W. J., Hopkins, C. B. and Bloom, R., Physical-chemical treatment of wastewater. J. Wat. Pollut, Control Fed., 42, 83-88 (1970).
3 Jeris, J. S. and Owens, R. W., Polit-scale high-rate biological denitrification, J. Wat. Pollut. Control Fed., 47, 2045-2057 (1975).
4 Hoyland, G. and Robison, P. J., Aerobic treatment in OXITRON biological fluidized bed plant at Coleshill, Wat. Pollut. Control, 82, 479-493 (1983)
5 Cooper, P. F. and Williams, S. C., High-rate nitrification in a biological fluidized bed, Wat. Sci. Tech., 22, 431-442 (1990).
6 Semon, J., Sadick, T., Palumbo, D., Santoro, M and Keenan, P., Biological upflow fluidized bed denitrification reactor demonstration project—Stanford, Conn., USA, Wat. Sci. Tech., 36, 139-146 (1997).
7 Zhu, J., Zheng, Y., Dimitre G. Karamanev and Amarjeet S. B., (Gas-) Liquid-solid circulating fluidized beds and their potential applications to bioreactor engineering. Can. J. Chem. Eng., 78, 82-94 (2000).
8 Liang, W. G., Zhang, S. L., Zhu, J. X., Yu, Z. Q., Jin, Y. and Wang, Z. W., Flow characteristic of the liquid-solid circulating fluidized bed, Power Technol. 90, 95-102 (1997).
9 Zheng, Y., Zhu, J. X., Wen, J. Z., Bassi, A. S. and Margaritis, A., The axial hydrodynamic behaviour in a liquid-solid circulating fluidized bed. Can. J. Chem. Eng. 77, 284-290 (1999).
10 Zheng, Y., Zhu, J.-X., Marwaha, N. S. and Bassi, A. S., "Radial solids flow structure in a liquid-solids circulating fluidized bed", Chem. Eng. J., 88(2), 141-150, 2002.
11. Liang, W.-G., Wu, Q.-W., Yu, Z.-Q., Jin, Y. and Bi, X-T., Flow regimes of the three-phase circulating fluidized bed, American Institute Chem. Eng. J., 41, 267-271 (1995).

12. Liang, W.-G., Yu, Z.-Q., Jin, Y., Wang, Z.-W., and Wu, Q.-W., Phase holdups in a gas-liquid-solid circulating fluidized bed, Chem. Eng. J. & Biochem. Eng. J., 58, 259-264 (1995).
13. Liang, W.-G., Wu, Q.-W., Yu, Z.-Q., Jin, Y. and Wang, Z.-W., Hydrodynamics of a gas-liquid-solid three phase circulating fluidized bed, Can. J. Chem. Eng., 73, 656-661 (1995).
14 Robinson J A, Trulear A G, and Characklis W G, Cellular Reproduction and Extracellular Polymer Formation by Pseudomonas aeruginosa in Continuous Cultures, *Biotechnol. & Bioeng.*, XXV, 1409, (1984).
15 Metcalf and Eddy, Wastewater Engineering: Treatment, Disposal, and Reuse, McGraw Hill Publishing Co., 3 vol. Edition P, 604, (1991).
16 Chian E S, and DeWalle F B, Treatment of High Strength Acidic Wastewater with a Completely Mixed Anaerobic Reactor, *Water Research,* 11, 295-304, (1977).
17 Rogalla F., Payradeau M., Bacquet G, Bourbigot, M M and Sibony J, Nitrification and Phosphorus Precipitation with Biological Aerated Fillers, *Water Environ. Res.,* 62(2), 169-176 (1990).
18 Switzenabum M S, and Jewel W J, Anaerobic attached-film expanded bed reactor treatment, J. Water Pollution Control Fed. 52, 1953-1965.
19 Ekama G A, and Wentzel M C, Difficulties and Developments in biological nutrient removal technology and modelling. Water Science & Technology, 39(6), 1-11(1999).
20 Gerber A, Mostert E S, Winter C T and Villiers R H, Interactions between phosphate, nitrate and organic substrate in biological nutrient removal processes, Water Science & Technology, 19, 183-194, (1987)
21 Zeng R J, Lemaire R, Yuan Z, Keller J, Simultaneous nitrification, denitrification and premoval in a lab-scale sequencing batch reactor, Biotechnology & Bioengineering, 84(2), 170-178 (2003), Simultaneous nitrification, denitrification and Premoval in a lab-scale sequencing batch reactor. Biotechnology & Bioengineering, 84(2), 170-178 (???)
22 Casey T G, Wentzel M C, Ekama G A, Lowenthal R E, and Marais G V R, "A Hypothesis for the Causes and Control of Anoxic-Aerobic (AA) Filament Bulking in Nutrient Removal Activated Sludge Systems", *Water Sci. Tech.,* 29(7), 203-212, 1994.
23 Musvoto E V, Casey T G, Ekama G A, Wantzzel M G and Marais G V R, The Effect of Incomplete Denitrification on Anoxic-Aerobic (Low F/m) Filament Bulking in Nutrient Removal Activated Sludge Systems, *Water Sci. Tech.,* 29(7), 295-299, 1994.
24 Van Dijk, J. C. and Braakensiek, H. Phosphate removal by crystallization in a fluidized bed. Wat. Sci. Tech., 17, 133-142 (1985).
25. Battistoni, P., Pavan, P., Cecchi, F. and Mata-Alvarez, J. Phosphate removal in real anaerobic supernatants: Modelling and performance of a fluidized bed reactor. Wat. Sci. Tech., 38, 275-283 (1998).
26 Zweger B, Arnold E and Wildever P A, Nutrient Balances for Combined Nitrification and Denitrification in Biofilters, Water Sci. Tech., 4(4), 91-95, 2000.

Therefore what is claimed is:

1. A process for biological nutrient removal in a raw wastewater feed stream to remove carbon, nitrogen and phosphorus therefrom, comprising the steps of:

flowing raw wastewater feed stream into a first fluidized bed and flowing a first fluidizing fluid into the first fluidized bed and passing solid particles having effective immobilized bacteria coated thereon and the first fluidizing fluid through an anoxic zone maintained under anoxic conditions suitable for denitrification of raw wastewater constitutents flowing through the anoxic zone, said first fluidized bed being operated with a liquid velocity of the first fluidizing fluid being lower than a transition velocity from a particulate fluidization regime to a fast fluidization regime;

circulating said solid particles and the first fluidizing fluid through an anaerobic zone maintained under anaerobic conditions in said first fluidized bed suitable for the release of stored phosphorus;

separating some of said first fluidizing fluid from said solid particles to form a recycle stream and circulating said solid particles and a remaining amount of the first fluidizing fluid into a second fluidized bed, wherein the first fluidizing fluid includes at least the recycle stream which is flowed into the first fluidized bed;

circulating the particles transferred to the second fluidized bed with a stream of a second fluidizing fluid through the second fluidized bed, the second fluidized bed having an aerobic zone maintained under aerobic conditions suitable for biodegradation of raw wastewater constitutents forming part of the second fluidizing fluid in the presence of oxygen to carbon dioxide, water, and nitrates by the immobilized bacteria to produce nitrified effluent from the aerobic zone; and circulating solid particles from said second fluidized bed to the first fluidized bed along with a part of the nitrified effluent and separating the remaining nitrified effluent from said solid particles in said second fluidized bed and removing a portion of this separated nitrified effluent from the system as treated effluent and recycling the rest back into an inlet to the second fluidized bed to form the second fluidizing fluid.

2. The process according to claim 1 wherein the first fluidizing fluid also includes the raw wastewater feed stream mixed with the recycle stream, and wherein the anoxic zone is located above an inlet into which the first fluidizing fluid is injected, and wherein the anaerobic zone is located above the anoxic zone.

3. The process according to claim 2 including mixing a rest of said remaining amount of the nitrified effluent with said recycle stream and with said raw wastewater feed stream to produce the first fluidizing fluid and injecting the first fluidizing fluid at an inlet to said first fluidized bed.

4. The process according to claim 1 wherein the raw wastewater feed stream is injected into the first fluidized bed at a point substantially midway up the first fluidized bed above an inlet for the first fluidizing fluid, and wherein the anoxic zone is located above the anaerobic zone.

5. The process according to claim 1 including injecting a gas into a lower end of the second fluidized bed, to form a gas-liquid-solid fluidized bed.

6. The process according to claim 1 wherein the solid particles are flowed in co-current flow with the first fluidizing fluid through the first fluidized bed, and wherein the solid particles are flowed in countercurrent flow with the second fluidizing fluid through the second fluidized bed.

7. The process according to claim 1 in which both the first fluidized bed and the second fluidized bed are operated in a conventional particulate fluidization regime.

8. The process according to claim 7 including injecting a gas into a lower end of the second fluidized bed to form a gas-liquid-solid fluidized bed.

9. The process according to claim 1 wherein the aerobic zone under aerobic conditions in the second fluidized bed is formed by injecting a gas containing oxygen into the second fluidized bed.

10. The process according to claim 9 wherein the first and second fluidized beds are substantially vertical columns, and wherein said first fluidizing fluid flows upwards and said solid particles flow upwards to flow concurrently in the first fluidized bed.

11. The process according to claim 10 wherein the anoxic zone is located below the anaerobic zone, and wherein the first fluidizing fluid is flowed into an inlet in the first fluidized bed below the anoxic zone.

12. The process according to claim 1 wherein the first and second fluidized beds are substantially vertical columns, and wherein said second fluidizing fluid flows upwards and said solid particles flow downwards to flow in countercurrent flow relationship with the second fluidizing fluid through the second fluidized bed.

13. The process according to claim 1 wherein the second fluidized bed is operated under conditions suitable to give a particulate fluidization regime so that the solid particles flow under gravity to a bottom of the second fluidized bed.

14. The process according to claim 1 wherein the step of circulating said solid particles and a remaining amount of the first fluidizing fluid into the second fluidized bed includes forming a moving packed bed between the first and second fluidized beds.

15. The process according to claim 1 wherein the step of circulating the solid particles from said second fluidized bed to the first fluidized bed along with some of the nitrified effluent includes forming a moving packed bed between the second and first fluidized beds.

16. The process according to claim 1 including a step of removing sloughed sludge from the first and/or second fluidized bed formed during treatment of the wastewater.

17. The process according to claim 1 including a step of extracting solid particles from a pre-selected location in said second fluidized bed and circulating them to said first fluidized bed, and/or including a step of extracting solid particles from a pre-selected location in said first fluidized bed and circulating them to said second fluidized bed.

18. A twin liquid-solid fluidized bed system, comprising:
solid particles having effective immobilized bacteria coated thereon,
a first fluidized bed having a first and second end, said first fluidized bed being a riser fluidized bed including an inlet at said first end for introducing a first fluidizing fluid into said first fluidized bed;
a second fluidized bed being a downer fluidized bed having a first end and a second end;
first connecting conduit connecting said second end of said first fluidized bed to said first end of said second fluidized bed, said first connecting means including means to feed said solid particles into said second fluidized bed;
second connecting conduit connecting said second end of said second fluidized bed to said first end of said first fluidized bed; and
means to feed said solid particles having effective immobilized bacteria coated thereon into said second fluidized bed through said first connecting conduit and to feed said solid particles into said first fluidized bed through said second connecting conduit, wherein said solid particles and said second fluidizing fluid flow in counter flow relationship in said second fluidized bed and wherein said solid particles and said first fluidizing fluid flow co-currently in said first fluidizing column, said first fluidized bed configured such that a liquid velocity of the first fluidizing fluid is lower than a transition velocity from a particulate fluidization regime to a fast fluidization regime.

19. The twin liquid-solid fluidized bed system according to claim 18 configured for biological nutrient removal from raw wastewater feed stream to remove carbon, nitrogen and phosphorus therefrom, the raw wastewater feed stream being fed into the first fluidized column through a wastewater feed stream inlet, which may or may not be the same as the inlet for the inlet at said second end of said first fluidized column, including gas injection means connected to said second fluidized bed, and wherein said second fluidized bed includes an aerobic zone for biodegrading wastewater predominately by the immobilized bacteria in the presence of oxygen, and wherein said first fluidized bed includes an anoxic zone for denitrification, and an anaerobic zone for phosphorus release.

20. The twin liquid-solid fluidized bed system according to claim 19 wherein said first fluidized bed further includes a fluid-solid separator means located at the second end thereof for separating solid particles from fluid and exhausting such separated fluid to provide separated solid particles which are fed by the means for feeding from the fluid-solid separator means to the second fluidizing bed, and wherein said first fluid circulating means circulates the separated fluid to the first end of the first fluidizing bed, and including a clarifier means located at the first end of said second fluidized bed for separating solid particles from fluid and withdrawing such separated fluid as treated effluent to provide separated solid particles which settle back into the second fluidized bed in order to minimize loss of particles through the effluent, wherein said clarifier means includes sludge withdrawal means for exhausting sloughed sludge formed during the process, and wherein said second fluid circulating means circulates some of the treated effluent to the second end of the second fluidizing bed as the second fluidizing fluid.

21. The twin liquid-solid fluidized bed system according to claim 19 wherein said first and second connecting conduits include any one of a pump and propeller for assisting in moving fluid and solid particles between said first and second fluidized beds.

22. The twin liquid-solid fluidized bed system according to claim 19 including a third conduit extending from said second conduit into a pre-selected location in said second fluidized bed for extracting solid particles from said pre-selected location in said second fluidized bed and circulating them to said first fluidized bed, and including a fourth conduit extending from said first conduit to a pre-selected location in said first fluidized bed for extracting solid particles from said pre-selected location in said first fluidized bed and circulating them to said second fluidized bed.

* * * * *